(12) United States Patent
Kusuhata

(10) Patent No.: US 9,888,142 B2
(45) Date of Patent: Feb. 6, 2018

(54) IMAGE SCANNING APPARATUS

(71) Applicant: RISO KAGAKU CORPORATION, Tokyo (JP)

(72) Inventor: Masahiko Kusuhata, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/206,778

(22) Filed: Jul. 11, 2016

(65) Prior Publication Data

US 2017/0034386 A1 Feb. 2, 2017

(30) Foreign Application Priority Data

Jul. 30, 2015 (JP) .................................. 2015-150859

(51) Int. Cl.
*H04N 1/04* (2006.01)
*H04N 1/10* (2006.01)
*H04N 1/00* (2006.01)

(52) U.S. Cl.
CPC ............. *H04N 1/10* (2013.01); *H04N 1/0071* (2013.01); *H04N 1/0075* (2013.01); *H04N 1/00684* (2013.01); *H04N 1/00734* (2013.01); *H04N 1/00769* (2013.01); *H04N 2201/0094* (2013.01)

(58) Field of Classification Search
CPC .... H04N 1/10; H04N 1/00684; H04N 1/0071; H04N 1/00551; H04N 1/00681
USPC ......... 358/498, 496, 497, 488; 399/380, 379
See application file for complete search history.

(56) References Cited

U.S. PATENT DOCUMENTS

| 7,471,424 | B2 * | 12/2008 | Ishido | ................ | H04N 1/00551 |
| | | | | | 358/449 |
| 8,861,047 | B2 * | 10/2014 | Ishido | ................ | H04N 1/00681 |
| | | | | | 358/449 |
| 2008/0094668 | A1 * | 4/2008 | Matsui | ............... | H04N 1/00681 |
| | | | | | 358/449 |
| 2013/0044334 | A1 | 2/2013 | Igawa et al. | | |

FOREIGN PATENT DOCUMENTS

| JP | 2007-174221 | | 7/2007 |
| JP | 2007174221 | A * | 7/2007 |

OTHER PUBLICATIONS

Extended European Search Report for EP 16180979.3 dated Nov. 14, 2016.

* cited by examiner

*Primary Examiner* — Cheukfan Lee
(74) *Attorney, Agent, or Firm* — Greenblum & Bernstein, P.L.C.

(57) ABSTRACT

An image scanning apparatus performs operations including: upon detection of a first angle, causing light to be emitted to an original and recording a distribution of reflected light of the emitted light as first read data; upon elapse of a predetermined time from detection of a second angle, causing light to be emitted to the original and recording a distribution of reflected light of the emitted light as second read data; detecting a closed state of a pressure plate based on the second read data; and upon determination of an angle of the pressure plate with respect to the platen being equal to or smaller than a third angle smaller than the second angle in the detection of the closed state, detecting a width of the original in an opening-closing direction of the pressure plate based on a difference between the first and second read data.

7 Claims, 13 Drawing Sheets

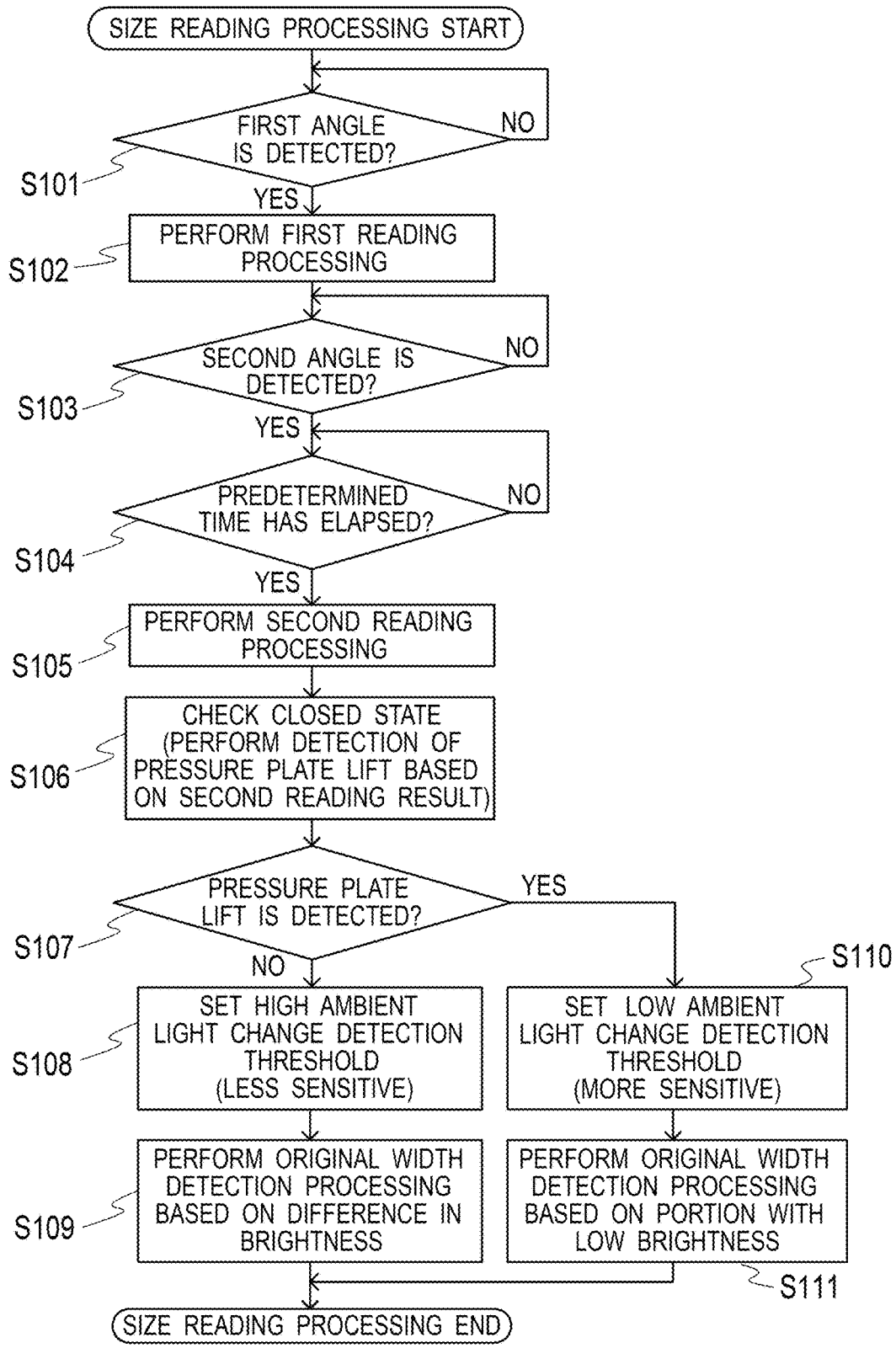

FIG. 13
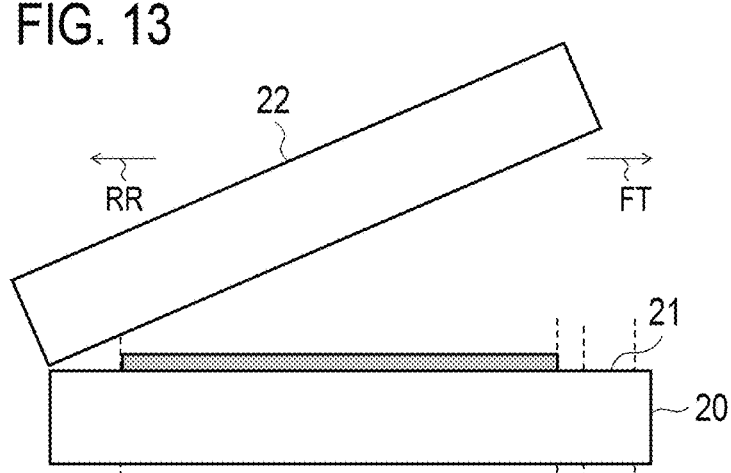
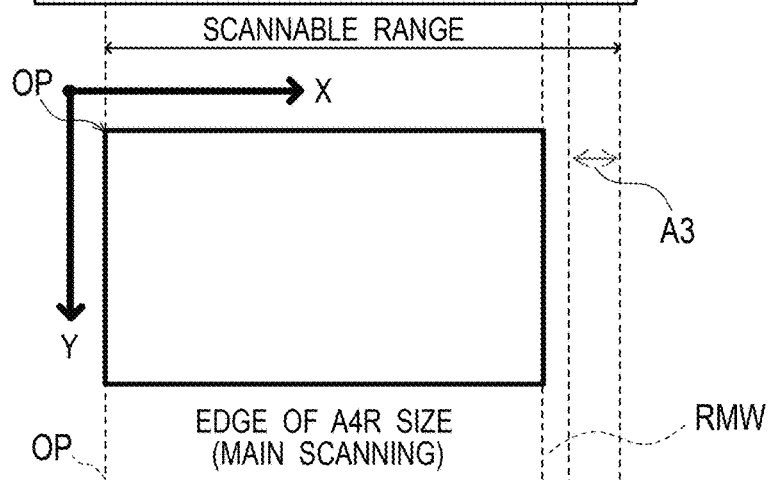
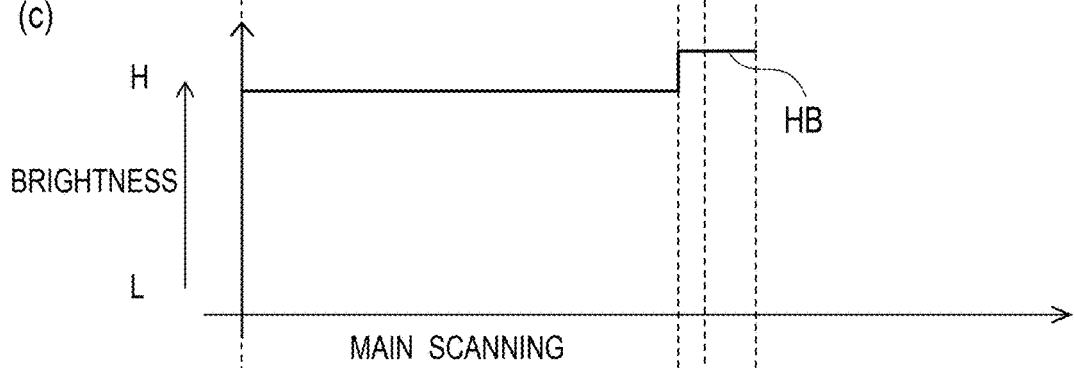
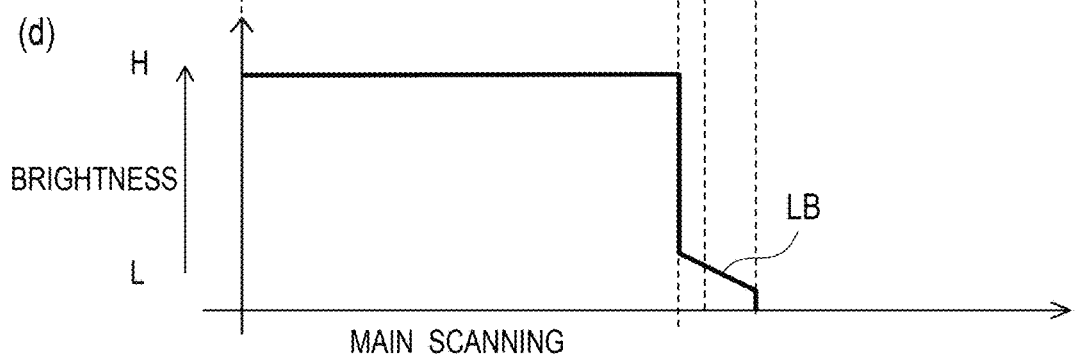

IMAGE SCANNING APPARATUS

CROSS REFERENCE TO RELATED APPLICATION

This application is based upon and claims the benefit of priority from the prior Japanese Patent Application No. 2015-150859, filed on Jul. 30, 2015, the entire contents of which are incorporated herein by reference.

BACKGROUND

1. Technical Field

The disclosure relates to an image scanning apparatus which is included in a scanner, a photocopier, a FAX machine, a multi-function printer, and the like, and which optically scans an original placed on a platen.

2. Related Art

There is an image scanning apparatus which is included in a scanner, a photocopier, a FAX machine, a multi-function printer, and the like, and which optically scans an original placed on a platen. When the image scanning apparatus erroneously determines the original size, the image scanning apparatus can only incorrectly scan an image and may obtain defective image data such as image data partly missing. To avoid this the image scanning apparatus is equipped with an original size detection mechanism configured to detect size of an original which is a scan target.

Mechanisms configured to detect the original size in an opening closing direction (main scanning direction) in which an original cover is opened and closed include a mechanism which reads an image of an original placed on a platen glass by use of a scanning device as follows. Specifically, in a state where the original is pressed from above by a pressure plate closed, the scanning device is made to emit light and receive reflected light while performing scanning.

In this mechanism, when the light is emitted in a state where the pressure plate is open, no reflected light is detected from a portion other than an original portion (non-original portion). Accordingly, the brightness varies between the original portion and the non-original portion. There is a method of detecting the original width by using this variation in brightness between the original portion and the non-original portion (hereafter, referred to as "black portion detection method").

The black portion detection method has the following tendency. Since reflection from a portion with high density on a print surface such as a solid black portion is low, it is likely that this solid black portion is detected as the non-original portion and erroneous detection of the original width occurs.

Japanese Unexamined Patent Application Publication No. 2007-174221 proposes a method improved to cope with the aforementioned problem. This technique utilizes a phenomenon in which reflection from the pressure plate in the non-original portion changes depending on the angle of the pressure plate in an opening-closing operation and the reflected light thus changes. In the technique, the original width is detected by detecting a boundary of the original portion and the non-original portion based on a portion in which the brightness of the reflected light changes (hereafter, referred to as "pressure plate opened-closed state difference method"). In the "pressure plate opened-closed state difference method," reading is triggered by detection by a sensor for detecting a pressure-plate semi-open state (middle angle sensor) and is performed in the pressure-plate semi-open state. When a predetermined time elapses from this reading, reading is performed again in a pressure-plate closed state (a state where the pressure plate is further closed from the semi-open state but is not completely closed). Pieces of read data (middle angle data and small angle data) obtained at two angles in the course of completely closing the pressure plate are compared with each other to detect a portion with the brightness difference, and the original width is calculated with the boundary between the original portion and the non-original portion determined based on the portion thus detected. The pressure plate opened-closed state difference method utilizes the brightness difference occurring between opening-closing stages of the pressure plate due to change in reflection from the pressure plate during the opening-closing operation, and can detect the original width regardless of the color of the sheet, the density of the print surface, and the like.

SUMMARY

The technique described in Japanese Unexamined Patent Application Publication No. 2007-174221 is based on the assumption that the angle of the pressure plate differs by a certain degree or more between the first reading operation and the second reading operation.

There is a case where, even when the predetermined time between the first reading operation and the second reading operation is appropriately set, the pressure plate in the second reading operation is not closed to the assumed angle. For example, in the case of scanning a relatively thick original such as a book, a range in which the pressure plate can be closed is limited. In such a case, there is sometimes no sufficient difference in brightness between the pieces of read data obtained in the respective reading operations and erroneous detection of the original width occurs. Moreover, when the pressure plate is positioned at a certain angle or greater, the reading is affected by ambient light and erroneous detection of the original width may thus sometimes occur. In order to solve these problems, use of expensive sensors capable of detecting the opened-closed angle of the pressure plate at high accuracy is conceivable. However, the manufacturing cost increases in such a case.

An object of the disclosure is to provide an image scanning apparatus capable of accurately detecting the size of an original without an increase in manufacturing cost.

An image scanning apparatus in accordance with some embodiments includes: a platen on which an original is placed; a pressure plate openable and closeable with respect to the platen; a first angle detector configured to detect that the pressure plate is closed from an open state to a first angle with respect to the platen; a second angle detector configured to detect that the pressure plate is further closed from the first angle to a second angle with respect to the platen; a processor; and a memory including instructions that, when executed by the processor, causes the processor to perform operations. The operations include: upon detection of the first angle by the first angle detector, causing light to be emitted to the original and recording a distribution of reflected light of the emitted light as first read data; upon elapse of a predetermined time from detection of the second angle by the second angle detector, causing light to be emitted to the original and recording a distribution of reflected light of the emitted light as second read data; detecting a closed state of the pressure plate based on the second read data; and upon determination of an angle of the pressure plate with respect to the platen being equal to or smaller than a third angle smaller than the second angle in the detection of the closed state, detecting a width of the original in an opening-closing direction of the pressure plate based on a difference between the first read data and the second read data.

In the configuration described above, light is emitted to the original when the pressure plate is in a "middle angle region" which corresponds to a period up to a time point where the pressure plate is closed from the open state to the first angle and when the pressure plate is in a "small angle region" which corresponds to a period after the pressure plate is further closed from the first angle to the second angle, and the distribution of the reflected light of the emitted light is recorded as the first read data and the second read data. Then, presence or absence of the "pressure plate lift" which is a state where the pressure plate is not closed is checked by detecting the closed state of the pressure plate, based on the second read data which is distribution of the reflected light obtained when the pressure plate is in the small angle region. The "pressure plate lift" refers to a state where the angle between the pressure plate and the platen is between the second angle and the third angle smaller than the second angle after the closing operation of the pressure plate. In the configuration described above, when there is no pressure plate lift, the detection of the original width in which a portion with great brightness change is set as a non-document region is executed based on the difference obtained by comparing the first read data and the second read data, that is the distribution of the reflected light obtained when the pressure plate is in the middle angle region and that obtained when the pressure plate is in the small angle region. The original width can be thus surely detected at high accuracy.

The operations may include: upon the angle of the pressure plate with respect to the platen being equal to or smaller than the first angle and being greater than the second angle, turning on and off the emission of the light, and recording a distribution of reflected light in a state where the emission of the light is on and a distribution of reflected light in a state where the emission of the light is off, as third read data; and detecting the width of the original by using the third read data instead of the first read data.

In the configuration described above, the distribution of the reflected light is recorded in the state where the emission of the light is on and in the state where the emission of the light is off when the angle of the pressure plate is greater than the second angle, and is used as the distribution of the reflected light obtained when the pressure plate is in the middle angle region. In this case, since the reflected light distribution in the state where the emission of the light is off includes only the ambient light, the ambient light can be removed by subtracting the reflected light distribution in the state where the emission of the light is off from the reflected light distribution in the state where the emission of the light is on. The original width can be thus surely detected at higher accuracy with an effect of the ambient light being removed by detecting the original width by using reflected light distribution obtained by subtracting the reflected light distribution in the state where the emission of the light is off from the reflected light distribution in the state where the emission of the light is on.

The operations may include: upon determination of the angle of the pressure plate with respect to the platen being equal to or smaller than the second angle and being greater than the third angle in the detection of the closed state, generating combined distribution data obtained by extracting a minimum value from the first read data and the second read data for each of distribution positions in a direction of the width of the original and detecting the width of the original based on a result of comparison between the generated combined distribution data and a first threshold; and upon determination of the angle of the pressure plate with respect to the platen being equal to or smaller than the third angle in the detection of the closed state, detecting the width of the original based on a second threshold and the difference between the first read data and the second read data.

In the configuration described above, the combined distribution data is generated by extracting the minimum value of the reflected light obtained when the pressure plate is in the middle angle region and the reflected light obtained when the pressure plate is in the small angle region for each position (the darker brightness value out of the first read data and the second read data for each position in the original width direction). When the lifted state of the pressure plate is detected (i.e. when the angle between the pressure plate and the platen is equal to or smaller than the second angle and is greater than the third angle), the original width is detected based on the result of comparison between the combined distribution data and the first threshold. When no lifted state of the pressure plate is detected (the angle between the pressure plate and the platen is equal to or smaller than the third angle), the original width detection in which a portion with great brightness chance is set as the non-original region is surely performed based on the comparison between the second threshold and the difference extracted from the reflected light distribution obtained when the pressure plate is in the middle angle region and that obtained when the pressure plate is in the small angle region. Since the minimum values of the reflected light are extracted in the combined distribution data, it is possible to remove the effect of the ambient light when the pressure plate is in the lifted state, and surely detect the original width at higher accuracy.

The operations may include, upon determination of the angle of the pressure plate with respect to the platen being equal to or smaller than the second angle and being greater than the third angle in the detection of the closed state, detecting the width of the original based on the first read data and a third threshold.

In the configuration described above, the original width can be surely and accurately detected even when the pressure plate is open and the effect of the ambient light present.

The operations may include, upon determination of the angle of the pressure plate with respect to the platen being equal to or smaller than the second angle and being greater than the third angle in the detection of the closed state: generating combined distribution data obtained by extracting a minimum value from the first read data and the second read data for each of distribution positions in a direction of the width of the original and detecting the width of the original based on a result of comparison between the generated combined distribution data and a first threshold; or detecting the width of the original based on the first read data and a third threshold greater than the first threshold.

An image scanning apparatus in accordance with some embodiments includes: a platen on which an original is placed; a pressure plate openable and closeable with respect to the platen; an angle detector configure to detect that the pressure plate is closed from an open state to a predetermined angle with respect to the platen; a processor; and a memory including instructions that, when executed by the processor, causes the processor to perform operations. The operations include: upon detection of the predetermined angle by the angle detector, causing light to be emitted to the original and recording a distribution of reflected light of the emitted light as first read data; upon elapse of a predetermined time from detection of the predetermined angle by the angle detector, causing light to be emitted to the original and recording a distribution of reflected light of the emitted light as second read data; detecting a closed state of the pressure plate based on the second read data; and upon determination of an angle of the pressure plate with respect to the platen being equal to or smaller than an angle smaller than a predetermined angle, detecting a width of the original in an opening-closing direction of the pressure plate based on a difference between the first read data and the second read data.

In the configuration described above, light is emitted to the original when closing of the pressure plate to the first angle is detected and when the predetermined time elapses from the time point where the pressure plate is closed and reaches the first angle, and the distribution of the reflected light of the emitted light is recorded. Then the closed state of the pressure plate is detected based on the second read data to check presence or absence of "pressure plate lift" which is the state where the pressure plate is not closed. In this case, the "pressure plate lift" refers to the state where the angle between the pressure plate and the platen is between the predetermined angle and an angle closed from the predetermined angle after the closing operation of the pressure plate. In the configuration described above, only when there is no pressure plate lift (the angle between the pressure plate and the platen is further closed from the angle closed from the predetermined angle), the detection of the original width in which a portion with great brightness change is set as the non-document region is executed based on the difference obtained by comparing the distribution of the first read data and the distribution of the second read data. The original width can be thus surely detected at high accuracy.

The operations may include, upon determination of the angle of the pressure plate with respect to the platen being equal to or smaller than the predetermined angle and being greater than the angle smaller than the predetermined angle in the detection of the closed state, generating combined distribution data by extracting a minimum value from the first read data and the second read data for each of distribution positions in a direction of the width of the original and detecting the width of the original based on the generated combined distribution data.

In the configuration described above, the combined distribution data is generated by extracting the minimum value from the first read data and the second read data (the darker brightness value from the first read data and the second read data) for each distribution position. When the lifted state of the pressure plate is detected (the angle between the pressure plate and the platen is between the predetermined angle and the angle closed from the predetermined angle), the original width is detected by using the generated combined data. Since the minimum values of the reflected light are extracted in the combined distribution data, the effect of the ambient light can be removed when the pressure plate is in the lifted state. Accordingly, the original width can be surely detected at higher accuracy.

As described above, in the configuration described above, the erroneous detection of the size in the direction in which the pressure plate for the original placed on the platen is opened and closed can be reduced without adding an expensive sensor and the like. Accordingly, it is possible to reduce the effect of the ambient light and accurately detect the size of the original while avoiding an increase in manufacturing cost due to addition of an expensive sensor and the like.

BRIEF DESCRIPTION OF DRAWINGS

FIG. 5 is a flowchart depicting image scanning operations in the embodiment.

Figure 8:
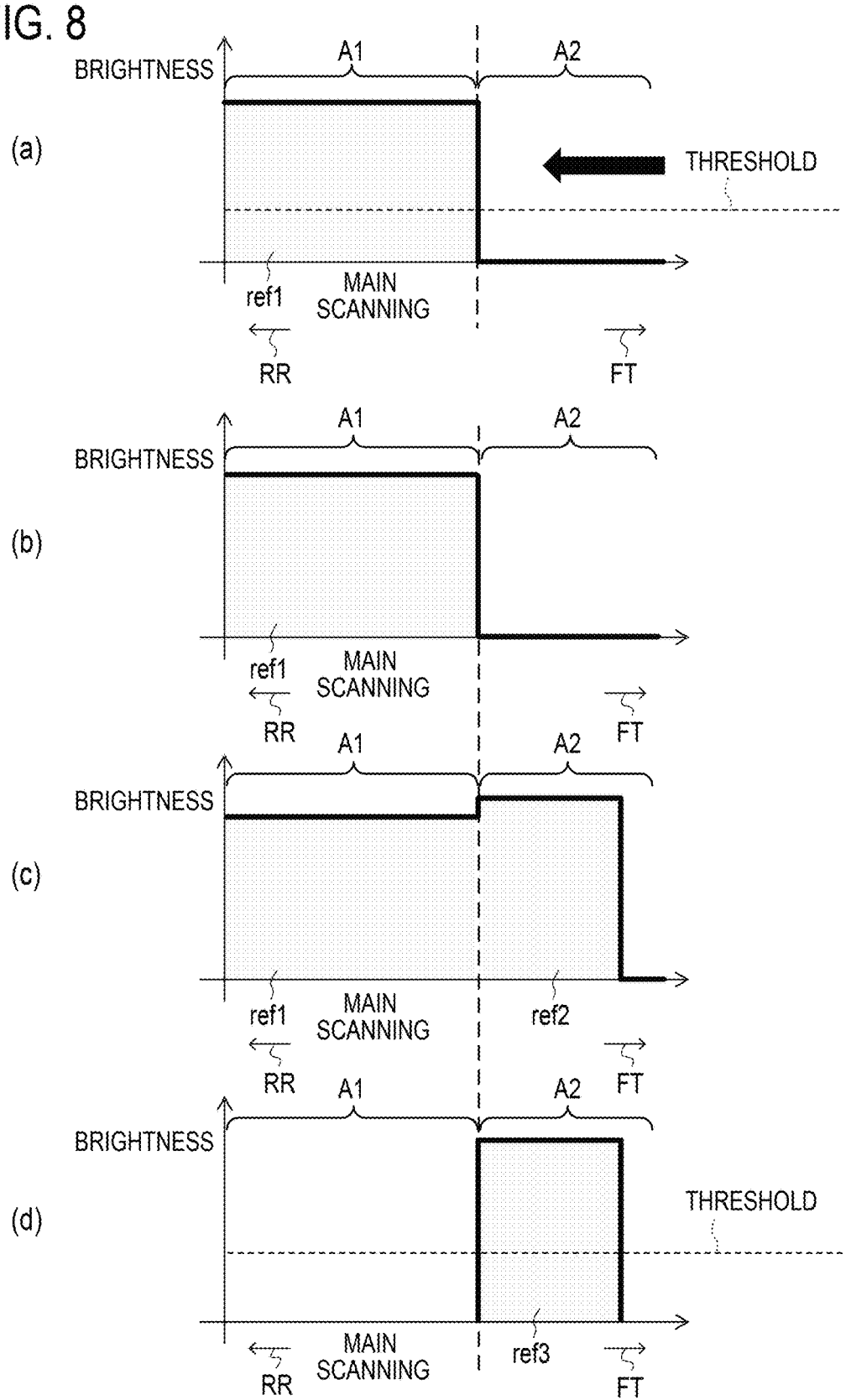

Parts (a) to (d) of FIG. 8 are explanatory views of original width detection performed when there is no lift of a pressure plate in a small angle region in, the embodiment.

Figure 9:
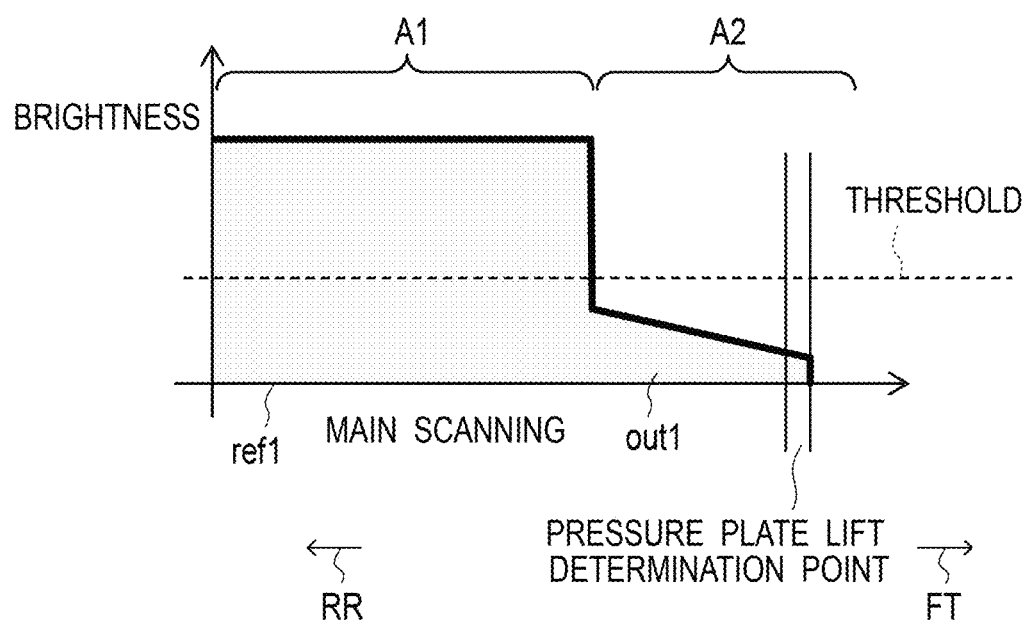

FIG. 9 is an explanatory view of original width detection by means of a black portion detection method which is performed when there is lift of the pressure plate in the small angle region in the embodiment.

Figure 10:
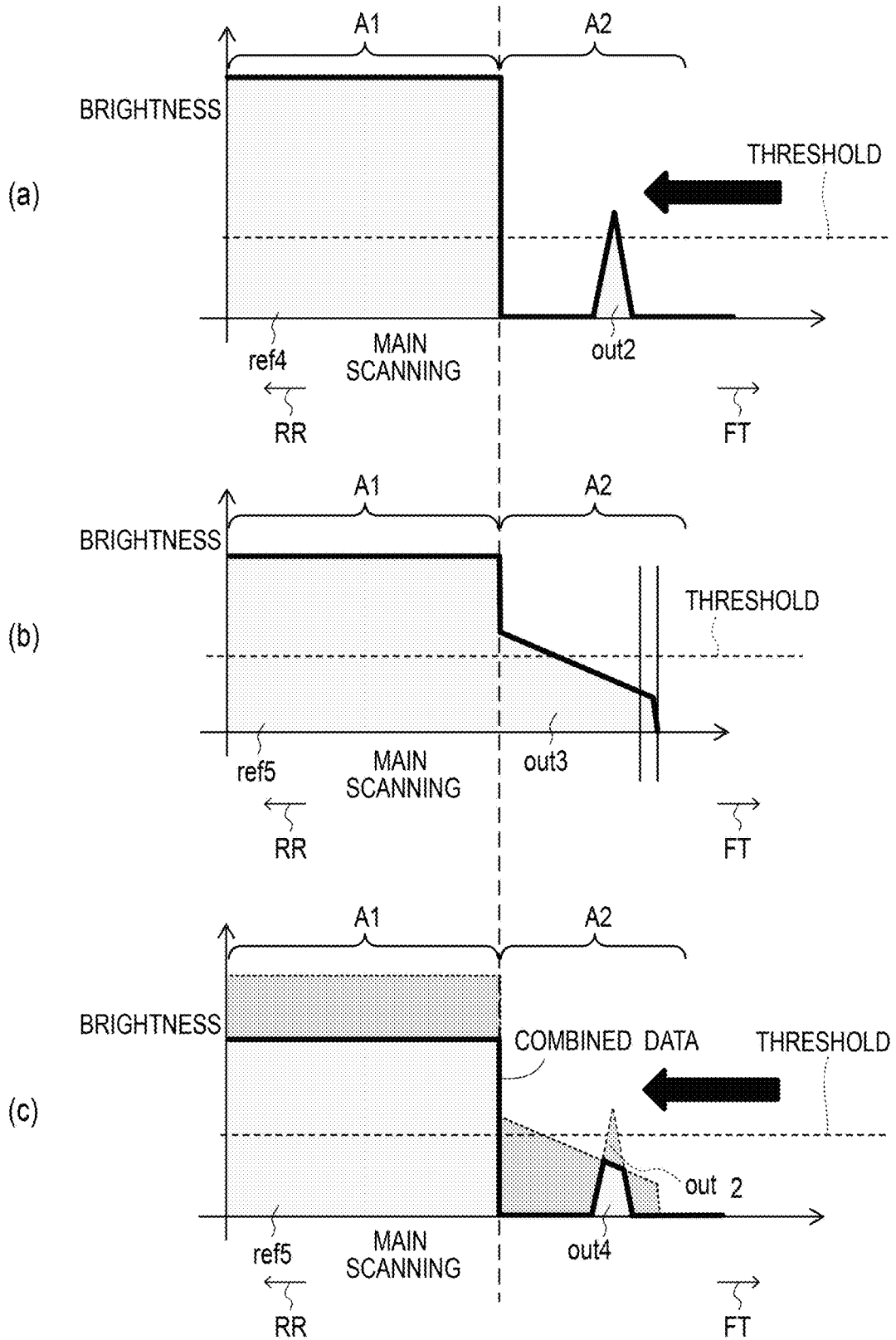

Parts (a) to (c) of FIG. 10 are explanatory views of original width detection using combined distribution data which is performed when there is lift of the pressure plate in the small angle region in the embodiment.

Figure 11:
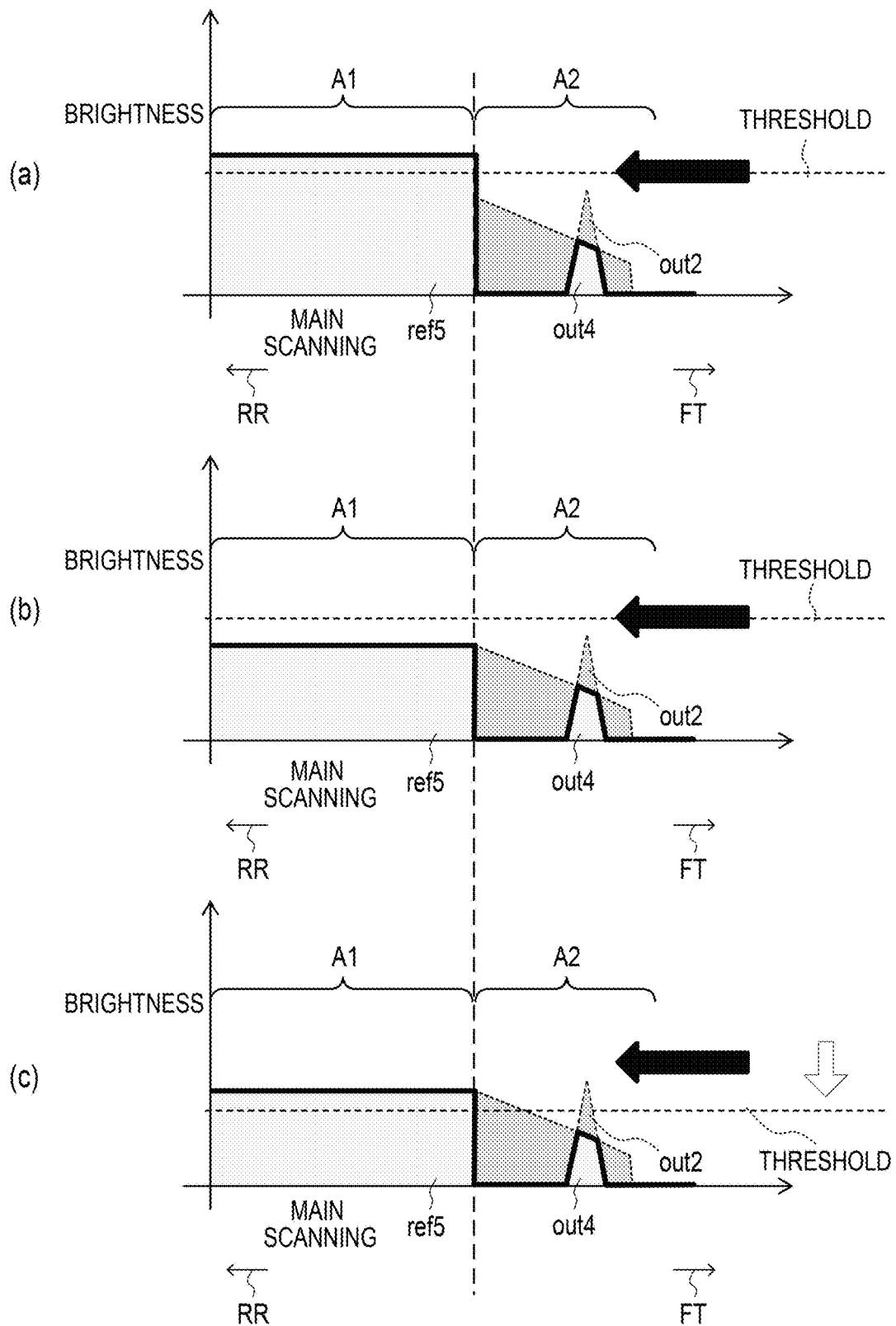

Parts (a) to (c) of FIG. 11 are explanatory views of a method of changing a threshold in the original width detection using the combined distribution data in the embodiment.

Figure 12:
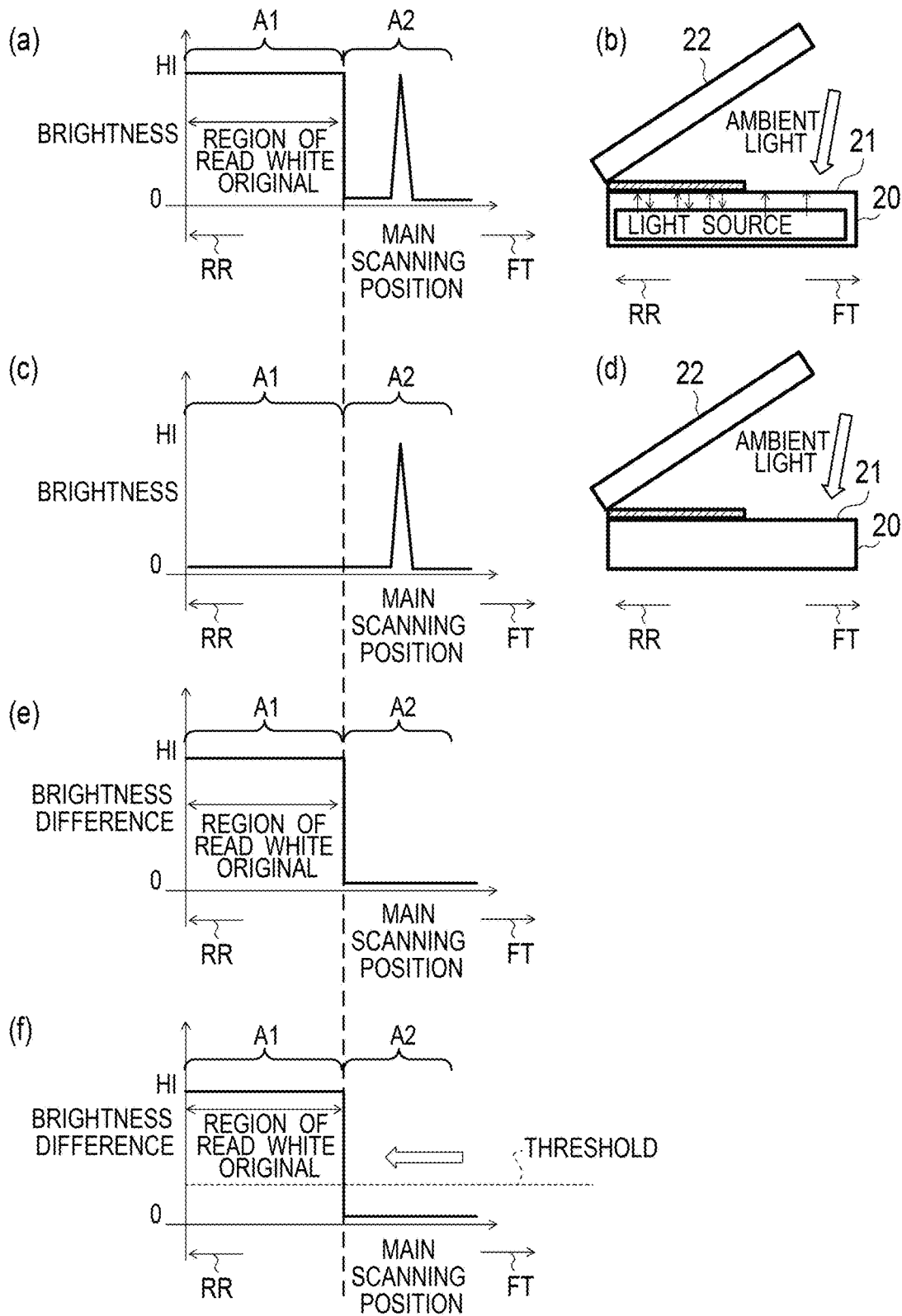

Parts (a) to (f) of FIG. 12 are explanatory views of detection by means of a light source ON-OFF difference method in the embodiment.

Parts (a) (d) of FIG. 13 are explanatory views illustrating a process of pressure plate lift detection in the embodiment.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Configuration of Image Scanning Apparatus

Figure 1A:
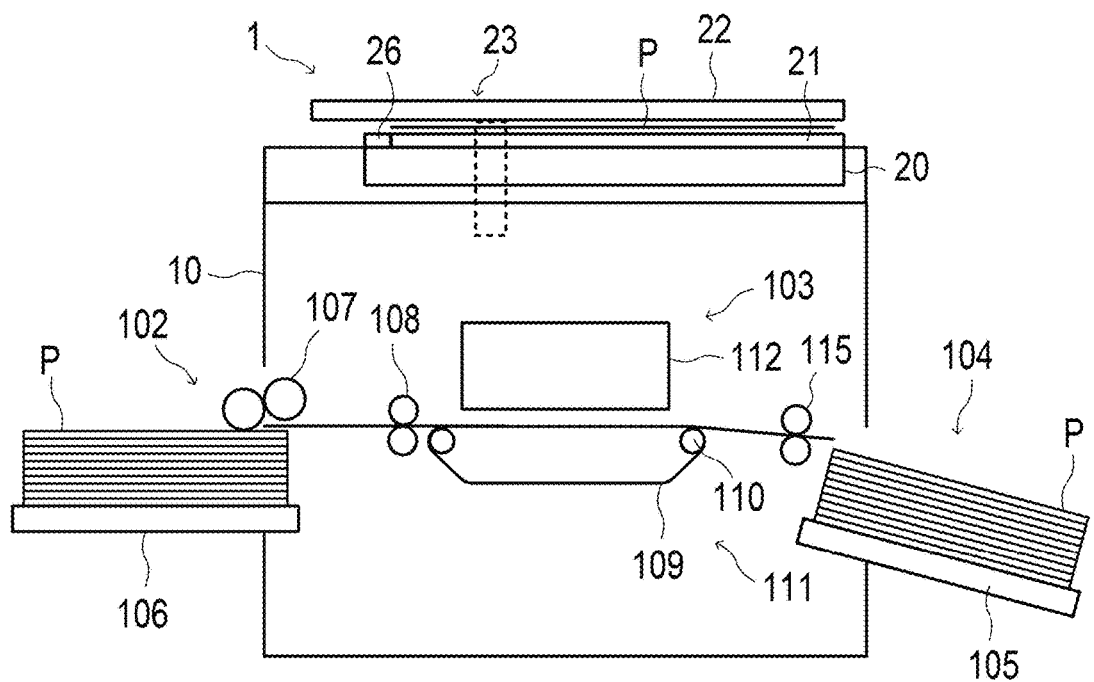
FIG. 1A is a front view illustrating a schematic configuration of an image formation apparatus including an image scanning apparatus in an embodiment.
Figure 1B:
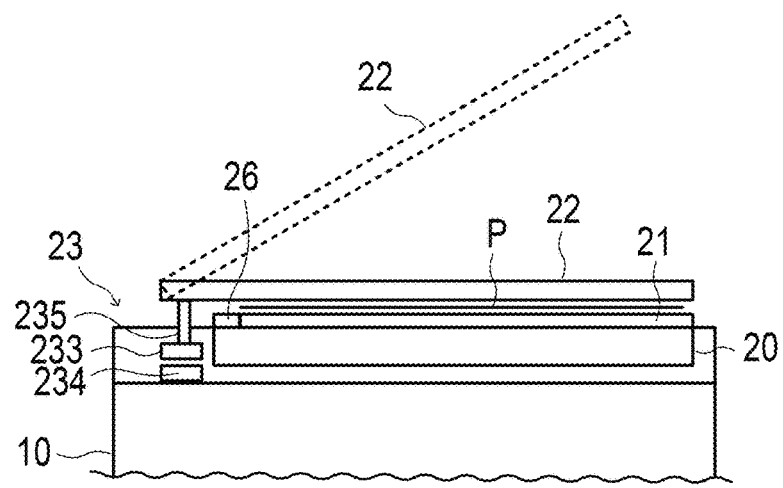
FIG. 1B is a side view of an image scanning apparatus portion in the image formation apparatus of FIG. 1A.
Figure 2:
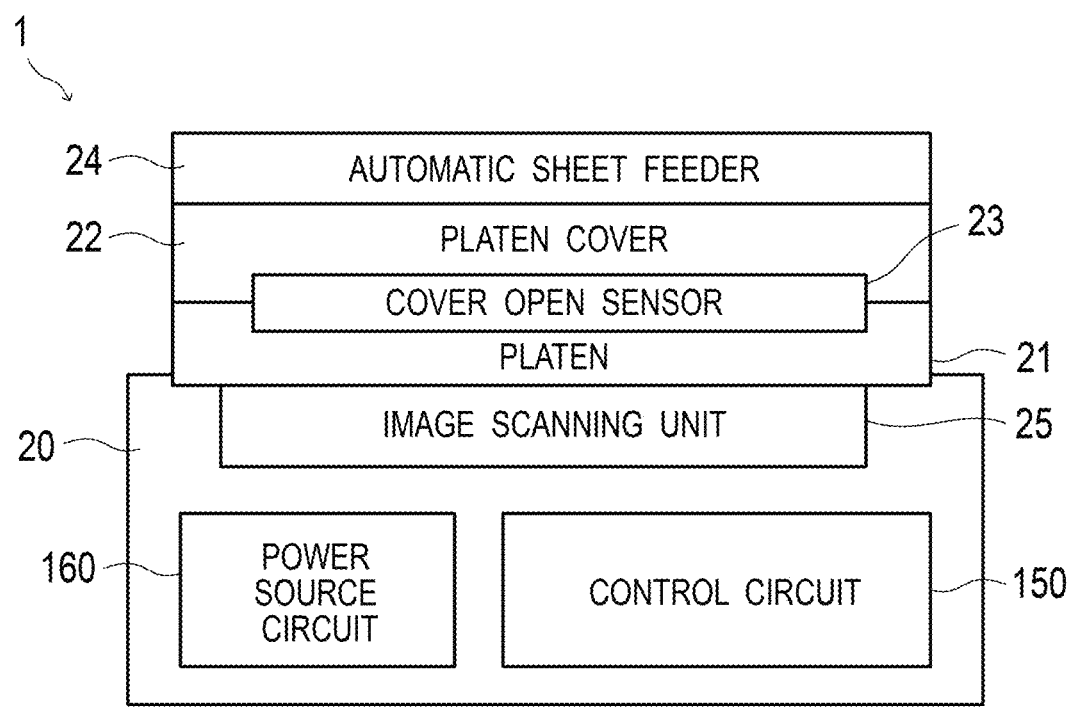
FIG. 2 is a block diagram illustrating the image scanning apparatus portion in the embodiment.

FIGS. 1A and 1B are explanatory views schematically illustrating a configuration of an image formation apparatus including an image scanning apparatus 1 in an embodiment of the present invention. FIG. 2 is a block diagram schematically illustrating a configuration of the image scanning apparatus 1 portion. The image scanning apparatus 1 employs a flat-bed method in which an original to be scanned is fixed and scanned. As illustrated in FIGS. 1A, 1B, and 2, the image scanning apparatus 1 includes, as a base body, a scanner 20 configured to optically scan the original, and is provided in an upper portion of a main body 10 of the image formation apparatus configured to form an image based on image data outputted from the scanner 20, on a recording medium such as a sheet. In FIGS. 6, 7A, 7B, and 13, X indicates a main scanning direction (direction of the width of the original), Y indicates a sub-scanning direction (direction of the length of the original), and OP indicates an original point (abutting position). In FIGS. 3A, 3B, and 8 to 13, FT indicates a front side and RR indicates a rear side (abutting position side).

The apparatus main body 10 includes a paper feeder 102, an image forming unit 103, a paper discharger 104, and a control circuit 150. The paper feeder 102 includes a paper feed tray 106 on which many sheets can be stacked and paper feeding rollers 107 which pick up the stacked sheets one by one and convey the sheet at a predetermined paper feeding timing. The paper feeder 102 is a unit which, in printing, supplies the sheet picked up by the paper feeding rollers 107 to the image forming unit 103 at the predetermined paper feeding timing while restricting a conveying direction of the sheet along a conveying route.

The image forming unit 103 includes: paired registration rollers 108 configured to correct skewing of the sheet supplied from the paper feeder 102 and feed the sheet subjected to the skewing correction at a predetermined printing timing; an image former 112 configured to print a desired image on the sheet fed from the registration rollers 108 and corresponding to a photosensitive drum and a developing device in an electrophotographic method, an inkjet head in an inkjet method, and a printing drum in a stencil printing method; and a conveyor 111 configured to convey the sheet by cooperation of an annular conveyor belt 109 which circulates and conveyor belt rollers 110 which rotate the conveyor belt 109 in a predetermined direction. The image forming unit 103 is a unit configured to print a desired image with the image former 112 while conveying the sheet supplied from the paper feeder 102 with the conveyor 111.

The paper discharger 104 includes a paper receiving tray 105 to which the sheet subjected to printing is discharged and multiple paired discharging rollers 115 configured to convey the sheet subjected to printing to the paper receiving tray 105. The paper discharger 104 is a unit which discharges the sheet subjected printing in the image forming unit 103 to the outside of the apparatus and on which the discharged sheets are stacked. Moreover, the control circuit 150 includes a CPU, a signal processing device, a communication processing device, and the like. Furthermore, a power source circuit 160 includes an electric power supplying device configured to supply electric power to the units.

As illustrated in FIG. 2, the scanner 20 includes a platen 21, a platen cover 22, an automatic sheet feeder 24, a cover open sensor 23, and the like. The platen 21 is an original table made of a transparent glass and the like and an original P to be scanned is placed on the platen 21. The platen cover 22 is provided above the platen 21. The platen cover 22 is opened and closed in an opening-closing direction (main scanning direction, original width direction) with respect to the platen 21 and is a pressure plate configured to press the original P placed on the platen 21. The color of a surface of the platen cover 22 which presses the original P is assumed to be white or a color close to white. The automatic sheet feeder 24 is an auto document feeder (ADF) which is integral with the platen cover 22 and which automatically sends the originals to the platen 21.

The cover open sensor 23 is an angle detector configured to detect an opened-closed state and an angle of the platen cover 22, and functions as a first angle detector configured to detect that an opened-closed angle of the platen cover 22 is closed from an open state to a first angle and as a second angle detector configured detect that the platen cover 22 is further closed from the first angle to a second angle. Specifically, the cover open sensor 23 is provided near a portion where a main body of the scanner 20 and the platen cover 22 are connected to each other, and detects whether an angle of the platen cover 22 with respect to the platen 21 has reached predetermined angles.

In detail, the cover open sensor 23 includes a sensor flag 235 and optical sensors 233, 234 installed in the scanner 20 near a supporting shaft for opening and closing the platen cover 22. The optical sensors 233, 234 are mechanisms for detecting multiple levels of the opened-closed angle of the platen cover 22. The sensor flag 235 which moves up and down in synchronization with the opening and closing of the platen cover 22 blocks lights of the optical sensors 233, 234, and the optical sensors 233, 234 can thereby detect the opened-closed angle of the platen cover 22. Note that although the optical sensors 233, 234 are used as the sensors in the embodiment, the sensors of the present invention are not limited to this. Any sensor which can detect the position of the sensor flag 235 moving in synchronization with the platen cover 22 may be used and, for example a photocoupler which is a similar photoelectric conversion unit may be used. Alternatively, for example, it is possible to employ a configuration in which a magnet is provided at a position corresponding to the sensor flag 235 and a state of the sensor flag 235 is detected by detecting the magnet with a magnetic sensor.

Moreover, in the scanner 20, a white reference plate 26 used to obtained data and the like for performing shading correction is arranged at a predetermined position on the home position side of the platen 21.

Figure 6:
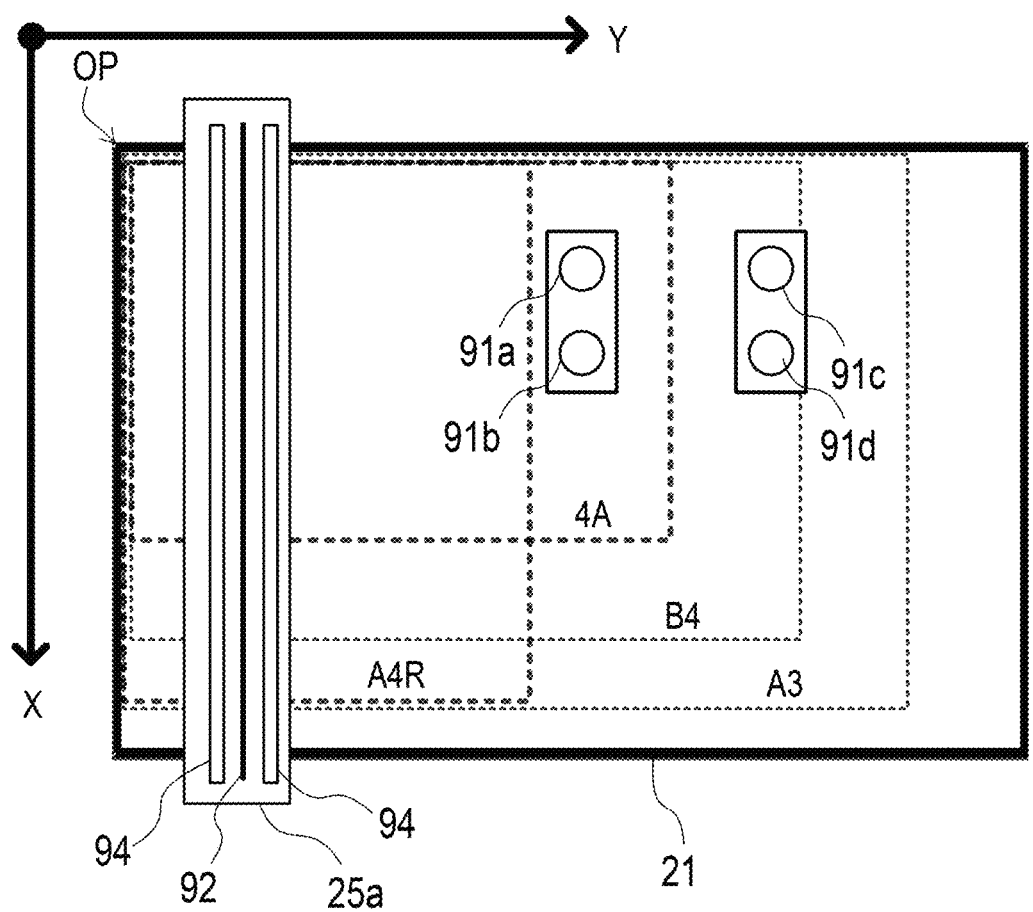
FIG. 6 is a top view illustrating a configuration of a platen in the embodiment.

As illustrated in detail in FIG. 6, an image scanning unit 25 includes a CCD line sensor 92 in which image scanning elements such as CCDs are linearly arranged; an exposure lamp 94 which is a light source; a carriage 25a in which the CCD line sensor 92 and the exposure lamp 94 are mounted; a motor which conveys the carriage 25a; and the like. The image scanning unit 25 scans an image from the original by causing the exposure lamp 94 to emit light onto the original P placed on the platen 21 or originals fed one by one by the automatic sheet feeder 24 and causing imaging elements such as the CCD 92 to receive the reflected light. Then the image scanning unit 25 outputs image data corresponding to the scanned image to the control circuit 150 as job data.

Figure 3A:
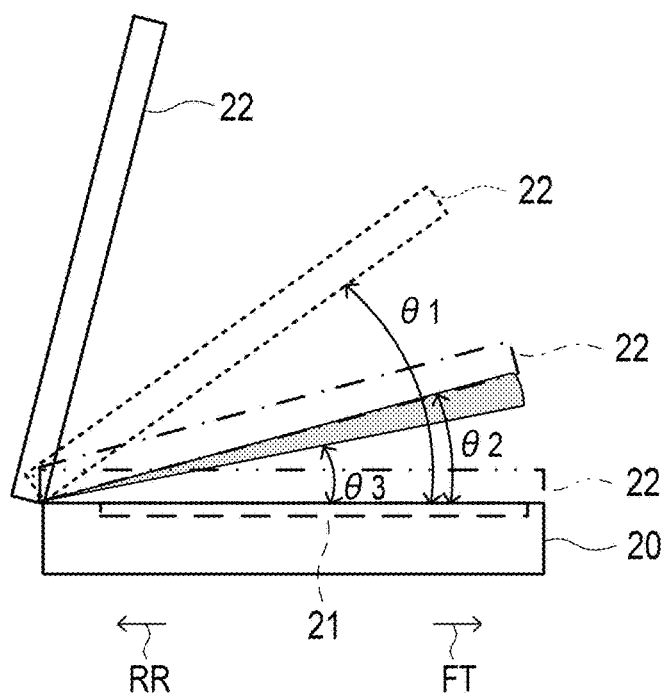
FIG. 3A is an explanatory view illustrating a schematic configuration of a platen cover.
Figure 3B:
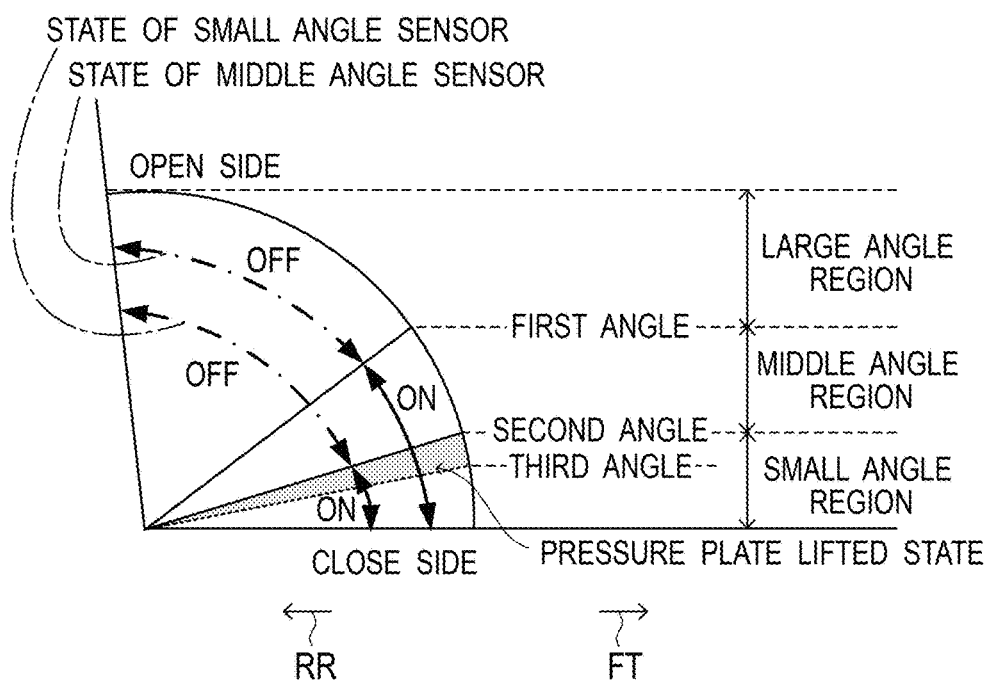
FIG. 3B is an explanatory view illustrating relationships among detection angle regions and angle sensors.

Next, an original detection angle of the platen cover 22 and detection of the angle of the platen cover 22 are described. FIG. 3A is a side view for describing positions of the platen cover 22. FIG. 3B is an explanatory view illustrating original size detection positions of the platen cover 22 and detection states of the sensors.

The platen cover 22 in the open state is at an open position illustrated by solid lines in FIG. 3A. The platen cover 22 in the closed state is at a closed posit on illustrated by two-dot chain lines in FIG. 3A. The platen cover 22 is opened and closed with respect to the platen 21 by being turned about one side in a rear portion.

The first angle corresponds to a position of the platen cover 22 illustrated by broken lines in FIG. 3A at which an angle θ between the platen 21 and the platen cover 22 is an angle θ1. The first angle θ1 is smaller than an angle between the platen 21 and the platen cover 22 at the open position. When the platen cover 22 reaches the position at which the angle θ becomes the first angle θ1 while being closed, the cover open sensor 23 determines that the opened-closed state of the platen cover 22 has changed.

The second angle corresponds to a position of the platen cover 22 illustrated by one-dot chain lines in FIG. 3A at which the angle θ between the platen 21 and the platen cover 22 is an angle θ2. The second angle θ2 is smaller than the first angle θ1. In the embodiment, the position of the platen cover 22 is classified into three regions. Specifically, as illustrated in FIG. 3B, an area in which the platen cover 22 is located is divided into three regions of: a small angle region in which the angle between the platen 21 and the platen cover 22 is equal to or smaller than the second angle θ2; a large angle region in which the angle between the platen 21 and the platen cover 22 is greater than the first angle θ1; and a middle angle region in which the angle between the platen 21 and the platen cover 22 is greater than the second angle θ2 and is equal to or smaller than first angle θ1 and which is located between the small angle region and the large angle region.

Furthermore, in the embodiment, the small angle region is divided into two regions depending on whether the platen cover 22 is on the closed side or the open side of a third angle θ3 which is an angle smaller than the second angle θ2 and which is illustrated in FIG. 3A. Moreover, "pressure plate lift" in the embodiment refers to a state where, as illustrated in FIG. 3B, the angle between the platen 21 and the platen cover 22 is equal to or smaller than the second angle but is greater than the third angle after the predetermined time elapses from the time point at which the platen cover 22 is closed to the second angle in the closing and stopping thereof.

In which one of the aforementioned regions the platen cover 22 is located is determined from the detection result of the cover open sensor 23. Specifically, the cover open sensor 23 is configured such that, when the platen cover 22 reaches the first angle by being moved from the large angle region to the middle angle region, a middle angle sensor (optical sensor 233) is set from an OFF state to an ON state and, when the platen cover 22 reaches the second angle by being moved from the middle angle region to the small angle region, a small angle sensor (optical sensor 234) is set from the OFF state to the ON state. Detection of a state of the pressure plate lift will be described later.

Configuration of Characteristic Function Units of Image Scanning Apparatus

Figure 4A:
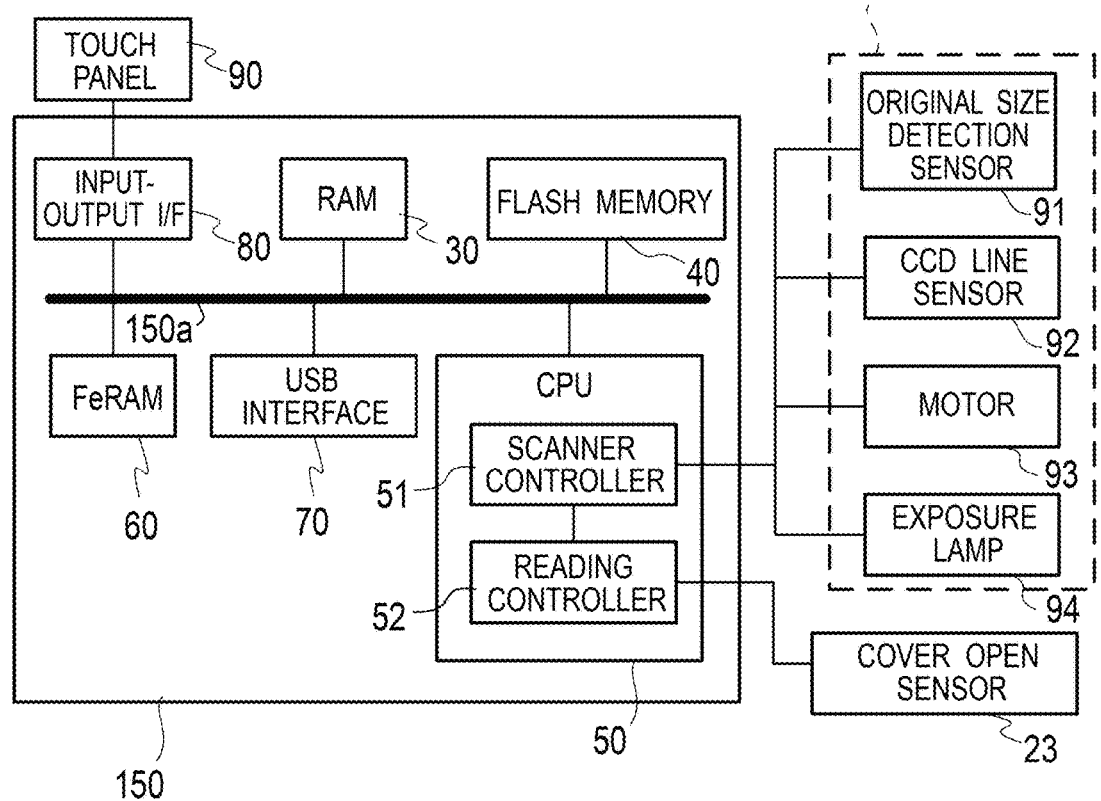
FIG. 4A is a block diagram illustrating characteristic function units of the image scanning apparatus in the embodiment.
Figure 4B:
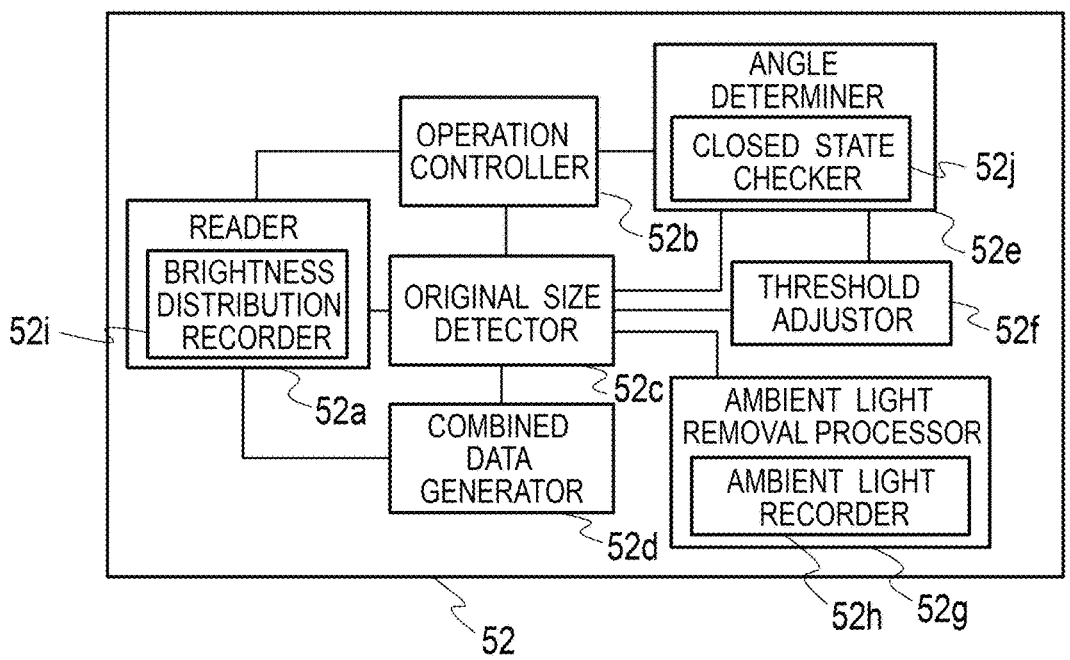
FIG. 4B is a block diagram illustrating function units of a reading controller.

FIG. 4A is a block diagram illustrating characteristic function units of the image scanning apparatus 1. FIG. 4B is a block diagram illustrating function units of a reading controller. Function units not important for the explanation of the embodiment are omitted for simplification.

As illustrated in FIG. 4A, the control circuit 150 includes a CPU 50, a RAM 30, a flash memory 40, an input-output interface 80, a FeRAM 60, an USB interface 70, and a system bus 150a connecting these units to one another.

Programs and circuit information for configuration are stored in a non-volatile manner in the flash memory 40. The RAM 30 is a work region of the CPU 50. The CPU 50 builds virtual function modules according to programs stored in the flash memory 40.

The image scanning, unit 25 includes an original size detection sensor 91 configured to detect the size of the original P placed on the platen 21. As illustrated in FIG. 6, the original size detection sensor 91 includes original length detection size sensors 91a to 91d configured to detect the length of the original in the sub-scanning direction. The original length detection size sensors 91a to 91d are reflection sensors including light emitting elements and light receiving elements, and are arranged respectively at positions corresponding to standard sizes.

Moreover, the image scanning unit 25 includes the CCD 92 configured to optically scan the image, a motor 93 configured to drive lens and mirrors of an optical system, and the exposure lamp 94 being lighting configured to emit light to the original. In the CCD 92, the light receiving elements are linearly arranged along the main scanning direction. The CCD 92 has, in addition to the function of scanning the image by scanning the light reflected from the original with the light receiving elements, a function of determining the original width by detecting the light reflected from the original P and ambient light incident on the platen 21 with the light receiving elements and detecting brightness distribution on a line whose original point is the abutting position of the original on the rear side. In the embodiment, which one of the standard sizes the original is detected from a combination of the original width in the main scanning direction which is detected by the CCD 92 and the original length in the sub scanning direction which is detected by the sensors 91a to 91d.

Meanwhile, various programs and data are stored in the flash memory 40 illustrated in FIG. 4A. The programs include circuit information for building logic circuits required for image scanning processing as well as circuit information of a reading controller 52. Various adjustment values and the like unique to the apparatus body of the image scanning apparatus 1 are stored in the FeRAM 60 in a non-volatile manner. A USB cable connecting the image scanning apparatus 1 and a printer being a host apparatus is connected to the USB interface 70.

The CPU 50 described above is an integrated circuit capable of forming virtual function modules such as a logic circuit by loading the programs. In the embodiment, a scanner controller 51 and the reading controller 52 are built by loading the programs. Note that, in the embodiment, "module" refers a function unit for achieving a predetermined operation and is formed of hardware such as a device and a machine, software having functions of the device and the machine, or combination of the hardware and the software.

The scanner controller 51 is a module configured to execute control related to the carriage 25a and the like and controls operations of devices such as the CCD 92, the motor 93, and the exposure lamp 94 which are included in the image scanning unit 25. Meanwhile, the reading controller 52 is a module which determines the original size in the image scanning and which executes computation processing required for the image scanning. In the embodiment, the reading controller 52 has a function of detecting changes in brightness of the ambient light.

The carriage 25a is a unit configured to move the CCD 92 and the exposure lamp 94 mounted thereon, and is moved horizontally in the sub-scanning direction by the motor 93.

Figure 7A:
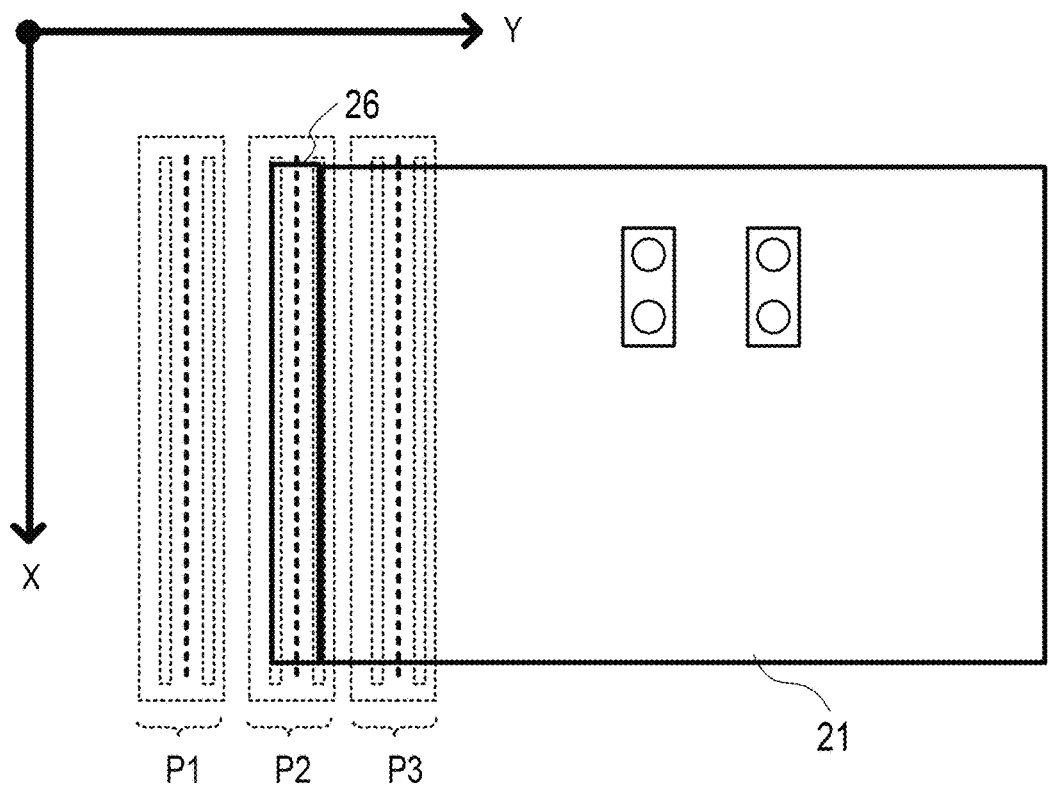
FIG. 7A is a top view illustrating positions of a carriage in the configuration of the platen in, the embodiment.
Figure 7B:
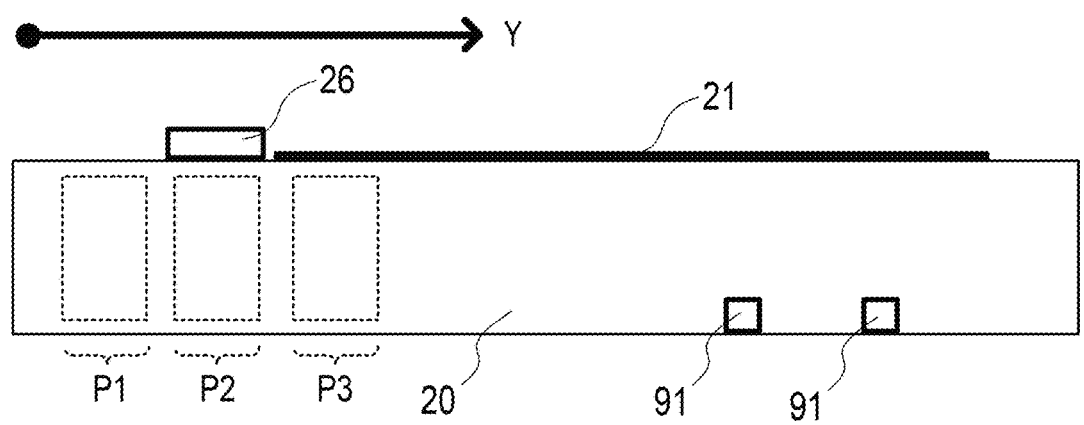
FIG. 7B is a side view illustrating the position of the carriage in the configuration of the platen in the embodiment.

In detail, as illustrated in FIGS. 7A and 7B, the carriage 25a is moved to a certain carriage position depending on a state of the image scanning apparatus 1 and a stage of the scanning operation. In a standby state, the carriage 25a is retreated to a home position P1 away from a glass surface of the platen 21 in the sub-scanning direction. The home position P1 is located on the retreated side (left side in the y-axis direction of FIG. 7A) of the original point which is the abutting position. The home position P1 is a position corresponding to an AF window provided at a portion where the original passes during an automatic feeding operation, and is used also as a prior ambient light detecting position. In the shading correction, the carriage 25a is moved to a shading reading position P2. The shading reading position P2 is a position adjacent to the home position P1 on the platen 21 side and corresponds to the white reference plate 26. The shading reading position P2 is used to obtain data and the like for performing the shading correction by reading the white reference plate 26. In the detection of the original size, the carriage 25a is moved to an original size detecting position P3. The original size detecting position P3 is a position under the glass surface of the platen 21 and is away from the original point by about 2 cm in the sub-scanning direction.

Configuration of Reading Controller

FIG. 4B is a block diagram illustrating an internal configuration of the reading controller 52. As illustrated in FIG. 4B, the reading controller 52 mainly includes a reader 52a, an original size detector 52c, and an angle determiner 52e as modules related to the original size detection.

The reader 52a is a module which turns on the exposure lamp 94 (cause the exposure lamp to emit light) at predetermined timings, when the opened-closed angles are detected and which analyzes the distribution of the reflected light included in the image data read by the CCD 92. The reader 52a includes a brightness distribution recorder 52i. The brightness distribution recorder 52i is a module configured to record distribution data of the reflected light, which is read at the predetermined timing when each opened-closed angle is detected, in association with the timing at which the distribution data is read. The brightness distribution recorder 52i functions as a first reader configured to record distribution data of reflected light obtained when first angle is detected (first read data) and as a second reader configured to record distribution data of reflected light obtained when a predetermined time elapses from passing of the second angle (second read data).

The original size detector 52c is a module configured to detect the width and length of the original from various pieces of data detected or analyzed by the modules of the reading controller 52. The original size detector 52c functions as an original width detector. Depending on a detection result of a closed state checker 52j, the original size detector 52c detects the original width based on difference between the first read data and the second read data such that a portion where brightness changes greatly is set as a non-document portion.

The angle determiner 52e is a module configured to determine an angle region from the opened-closed angle of the platen cover 22 detected by the cover open sensor 23. In the original size detection, the angle determiner 52e detects that the angle of the platen cover 22 has changed from the open state to the first angle and that the angle of the platen cover 22 has further changed from the first angle to the second angle. The angle determiner 52e in the embodiment has the closed state checker 52j. The closed state checker 52j is a module configured to determine lift of the platen cover 22 in the small angle region. The closed state checker 52j detects a closed state of the platen cover 22 based on the distribution data of reflected light obtained at the timing after the predetermined time elapses from the detection of the second angle (second read data), and determines whether the lift of the pressure plate is present or absent.

Furthermore, the reading controller 52 includes a combined data generator 52d, a threshold adjustor 52f, and an ambient light removal processor 52g.

The combined data generator 52d is a module configured to generate combined distribution data obtained by comparing the light distribution data of the first read data and the light distribution data of the second read data and extracting the minimum value for each of distribution positions in the original width direction. When the closed state checker 52j detects the lifted state of the platen cover 22 (when the angle between the platen 21 and the platen cover 22 is equal to or smaller than the second angle θ2 but is equal to or greater than the third angle θ3), the original size detector 52c detects the original width based or a result of comparison between a predetermined threshold and the combined distribution data generated by the combined data generator 52d. Meanwhile, when the closed state checker 52j detects no lifted state of the platen cover 22 (when the angle between the platen 21 and the platen cover 22 is equal to or smaller than the third angle θ3), the original size detector 52c detects the original width based on the predetermined threshold and the difference between the first read data and the second read data such that a portion where the brightness changes greatly is set as the non-document portion.

The threshold adjustor 52f is a module configured to change the predetermined threshold, depending on whether the closed state checker 52j detects the lifted state of the platen cover 22 or not. The threshold in the case where the lifted state of the platen cover 22 is detected is set to be smaller (darker) than the threshold in the case where no lifted state of the platen cover 22 is detected. The threshold set by the threshold adjustor 52f is inputted into the original size detector 52c.

The ambient light removal processor 52g is a module configured to cause the exposure lamp 94 which emits light to the original to be turned on and off, record the distribution of the reflected light in the lamp on state and that in the lamp off state, and eliminate a component of the ambient light based on a difference extracted from the recorded distribution of reflected or incident light. The ambient light removal processor 52g includes an ambient light recorder 52h. The ambient light recorder 52h is a module configured to cause the exposure lamp 94 to be turned on and off when the opened-closed angle of the pressure plate is greater than the second angle θ2 and record the distribution of reflected light or incident light in the lamp on state and that in the lamp off state. The ambient light removal processor 52g subtracts the component of the ambient light (distribution of the reflected light or the incident, light in the lamp off state) from the distribution of the reflected light or the incident light in the lamp on state, and records the result of this subtraction in the ambient light recorder 52h.

Note that this processing is preferably executed when the angle of the pressure plate is changed from the first angle to the second angle. Moreover, the processing may be performed only when an instruction is given by the user or every time the opening and closing of the pressure plate is performed.

The original size detector 52c detects the original width by using, instead of the first read data, a result of computation by the ambient light removal processor 52g stored in the ambient light recorder 52*h*. Specifically, a portion where the brightness changes greatly is set as the non-document portion, based on a difference between the second read data and the result recorded in the ambient light recorder 52*h* (third read data).

Operations of the modules described above are integrally controlled by an operation controller 52*b*. The operation controller 52*b* receives data from the sensors and distributes the data to the modules in the reading controller 52. Specifically, the operation controller 52*b* receives detection results of the sensors and read image data from the original size detection sensor 91 and the CCD 92 through the scanner controller 51 and receives the opened-closed angle of the platen cover 22 from the cover open sensor 23.

Process of Pressure Plate Lift Detection

A method of detecting the pressure plate lift in the embodiment is described. In the embodiment, the closed state (lifted state) of the pressure plate is detected in the small angle region and the method of detecting the original width switched based on a result of the detection of the closed state. In this description, presence or absence of the lifted state is determined by detecting the closed state of the platen cover 22 (pressure plate) based on the distribution of the reflected light obtained when the platen cover 22 is in the small angle region (second read data). This determination is performed to switch the method of detecting the original width depending on the opened-closed state of the pressure plate. For example, in a state where the pressure plate is lifted, it is not appropriate to detect the original width by using the pressure plate opened-closed state difference method using the value of difference between the pieces of read data, and use of this method leads to erroneous detection of the original width.

The process of pressure plate lift detection is described in detail. As illustrated in part (a) and part (b) of FIG. 13, a fact that brightness in a pressure plate lift detection region (lift detection region) A3 illustrated in part (b) of FIG. 13 is low is detected by using the second read data read when the platen cover 22 is in the low angle region. The lift detection region A3 is set at an end of a reading portion of the platen 21, that is at a specific main scanning position away from the abutting position by a distance greater than the reading maximum width (maximum size detection position) (broken line RMW in FIG. 13). When the platen cover 22 is completely closed, as illustrated by brightness HB in part (c) of FIG. 13, brightness in the lift detection region A3 and its vicinity is high due to light reflected from the pressure plate. Meanwhile, in the state where the pressure plate is lifted, as illustrated by brightness LB in part (d) of FIG. 13, the reflected light is diffused due to lifting of the pressure plate and the brightness in the lift detection region A3 and its vicinity is low. In the embodiment, the pressure plate lift is determined to be present when the brightness in the lift detection region A3 is low (black).

Process of Original Width Detection Method

Next, the method of detecting the original width in the embodiment is described. In the embodiment, the method of detecting the original width is switched depending on the angle region and the presence or absence of the pressure plate lift.

(1) Detection Method in Case where Pressure Plate is in Large Angle Region and Middle Angle Region (1-1) Detection by Black Portion Detection Method The detection in the large angle region and the middle angle region uses a so-called black portion detection method which is based on the assumption that brightness in the original portion is high and brightness in the non-original portion is low, because the reflection from the pressure plate in these regions causes less reflected light. Specifically, as illustrated in part (a) of FIG. 8, brightness in each pixel on the line sensor extending in the main scanning direction is compared with a predetermined threshold from the front side based on the brightness distribution data obtained when the pressure plate is in the middle angle region (first read data), and a first position where the brightness exceeds the threshold is detected as an edge of the original. In the example illustrated in part (a) of FIG. 8, there is almost no light reflected by the original and the brightness is low in a region A2 on the front side. When the operation proceeds to a region A1 in which the original is placed, the brightness increases due to reflected light ref1 from the original and exceeds the threshold (third threshold). From these facts, the original is determined to be in the region A1, and the width or the region A1 is detected as the original width.

(1-2) Detection by Light Source ON-OFF Difference Method

When the reading is performed with the platen cover 22 fully opened and when the platen cover 22 is located in the large angle region or the middle angle region, the brightness increases in the original portion due to the reflected light and the brightness also increases in a portion where the ambient light is incident. Accordingly, an effect of the ambient light needs to be eliminated. In the embodiment, it is possible to use a method of detecting the original edge based on the difference between the brightness distribution of the reflected light in the case where the light source is ON and that in the case where the light source is OFF. Specifically, the lamp 94 is turned on and off when the pressure plate is located at any angle greater than the second angle, the brightness distribution of the reflected light in the lamp off state is subtracted from that in the lamp on state, and the resultant data is recorded as the difference data of the exposure lamp 94.

In the reading in the light source ON state, as illustrated in part (a) and part (b) of FIG. 12, the brightness in the region A1 on the rear side is high due to the light reflected by the original, and the ambient light is incident on a portion in the region A2 on the front side which is the non-original region. Meanwhile, in the reading in the light source OFF state, as illustrated in part (c) and part (d) of FIG. 12, the brightness is high only in the portion of the ambient light in the region A2 on the front side. Accordingly, by extracting the difference between these reading results, it is possible to generate fixed position read brightness data in which the brightness in the original portion is left as it is and only the brightness of the ambient light in the non-original region is eliminated as illustrated in part (e) of FIG. 12.

The brightness of each pixel on the line sensor extending in the main scanning direction is compared with the predetermined threshold from front side based on the fixed position read brightness data, and a first position where the brightness exceeds the threshold is detected as the original edge. In the example illustrated in part (f) of FIG. 12, the brightness in the region A2 on the front side is low in general because the ambient light is subtracted. Meanwhile when the operation proceeds to the region A1 in which the original is placed, the brightness increases due to the reflected light ref1 from the original and exceeds the threshold. From these facts, the original is determined to be in the region A1, and the width of the region A1 is detected as the original width.

(2) Detection Method in Case where there is No Lift of Pressure Plate in Small Angle Region (Pressure Plate Opened-Closed State Difference Method)

Meanwhile, when the pressure plate is in the small angle region, a case where the light reflected from the pressure plate is not received and a case where the ambient light enters the scan portion may occur depending on the presence or absence of the pressure plate lift in the small angle region. Accordingly, in the embodiment, the method of detecting the original width in the case where the pressure plate is in the small angle region is switched depending on the presence or absence of the pressure plate lift. Note that, in the embodiment, the pressure plate lift is detected based or the distribution of reflected light in the second read data at a position away from the center of rotation of the pressure plate (a hinge of the pressure plate) (on the front side), and the detection method of the original width is changed.

When there is no lift of the pressure plate in the small angle region (when the angle between the platen 21 and the platen cover 22 is equal to or smaller than the third angle θ3 smaller than the second angle θ2), the so-called pressure plate opened-closed state difference method is used in which brightness distribution of the first read data and that of the second read data are compared and, based on a result of this comparison, a portion where brightness change is equal to or greater than a predetermined threshold (second threshold) is set as the non-document portion. In detail, as illustrated in part (b) of FIG. 8, when the pressure plate is located in the large or middle angle region, no light reflected from the pressure plate is received in the non-document portion in the region A2 on the front side and the brightness is low in this portion. Then, when the pressure plate is closed and reaches the small angle region and there is no pressure plate lift, as illustrated in part (c) of FIG. 8, reflected light ref2 from the pressure plate is received in the non-document portion in the region A2 on the front side and the brightness increases in this portion. A brightness difference ref3 occurring in the non-document portion due to opening and closing of the pressure plate is thus detected as illustrated in part (d) of FIG. 8 by calculating the difference between the brightness distribution obtained when the pressure plate is in the small angle region (Part (c) of FIG. 8) and the brightness distribution obtained when the pressure plate is in the large or middle angle region (part (b) of FIG. 8). The original is thereby detected to be in the region A1 and the width of the region A1 is detected as the original width.

Note that the fixed position read brightness data of the middle angle region which is obtained in (1-2) described above (data obtained by subtracting read data obtained in the light source OFF state from the read data obtained in the light source ON state) may be used instead of the first read data used above. Since the original width is detected by using the data from which the effect of the ambient light is subtracted, erroneous detection of the original width can be suppressed.

(3) Detection Method in Case where there is Lift of Pressure Plate in Small Angle Region (3-1) Detection by Black Portion Detection Method When there is lift of the pressure plate in the small angle region, as illustrated in FIG. 9, ambient light out1 is likely to be received in the region A2 on the front side. In this case, it is possible to use the black portion detection method based on the assumption that brightness of reflected light ref1 in the original portion is high and brightness in the non-original portion is low. Specifically, as illustrated in FIG. 9, the predetermined threshold (third threshold) and the brightness of the each pixel on the line sensor extending in the main scanning direction are compared from the front side based on the brightness distribution data obtained when the pressure plate is in the middle angle region (first read data), and the first position where the brightness exceeds the threshold is detected as the original edge. In the example illustrated in FIG. 9, in the region A2 on the front side, there is no light reflected by the original, but the ambient light out1 is received. Hence, slight brightness, although lower than that in the region A1, is detected. Accordingly, in the embodiment, the threshold is set to a value higher than the brightness of the ambient light out1 to avoid detection of the ambient light out1. Then, the brightness is detected to exceed the threshold due to the reflected light ref1 from the original. The original is thereby determined to be in the region A1 and the width of the region A1 is detected as the original width.

(3-2) Detection by Combined Distribution Data

In the black portion detection method described above, in order to prevent erroneous detection related to an original with intermediate color at a middle density, a threshold for brightness used to determine presence or absence of the original is set low. Accordingly, the black portion detection method tends to be affected by the ambient light and erroneous detection is likely to occur. In view of this in the embodiment, the combined distribution data detection method can be selected instead of the black portion detection method, as the method of detecting the original width, depending on the intensity of the ambient light.

In detail, when the pressure plate is in the large or middle angle region, as illustrated in part (a) of FIG. 10, ambient light out2 is likely to be received in the region A2 on the front side. Accordingly, in the black portion detection method based on the assumption that brightness of reflected light ref4 in the original portion is high and brightness in the non-original portion is low, erroneous detection may occur due to the effect of the ambient light. Meanwhile, when the pressure plate in the small angle region is lifted, as illustrated in part (b) of FIG. 10, reflected light out3 which is light reflected from the pressure plate is received in the region A2 on the front side. In this case, depending on the intensity of the reflected light out3, there is a risk that brightness of the reflected light out exceeds the threshold and the edge of the original is erroneously detected.

In view of this, in the embodiment, as illustrated in part (c) of FIG. 10, the brightness distribution obtained when the pressure plate is in the middle angle region (part (a) of FIG. 10) and the brightness distribution obtained when the pressure plate is in the small angle region (part (b) of FIG. 10) are compared, that is the first read data and the second read data are compared to generate the combined distribution data obtained by extracting the minimum value for each distribution position. In the example illustrated in part (c) of FIG. 10, since the brightness distribution obtained when the pressure plate is in the small angle region is generally lower than the brightness distribution obtained when the pressure plate is in the middle angle region in the region A1 on the rear side, reflected light ref5 obtained when the pressure plate is in the small angle region is extracted as the minimum value in the region A1. Meanwhile, since the brightness distribution obtained when the pressure plate is in the middle angle region is lower than the brightness distribution obtained when the pressure plate is in the small angle region and is substantially zero in the region A2 being the non-document portion except for a local portion of the ambient light out2, the value of zero reflected light obtained when the pressure plate is in the middle angle region is extracted in the region A2 except for the portion of the ambient light out2. In the portion of the ambient light out2, a portion exceeding reflected light out3 obtained when the pressure plate is in the small angle region is cut, and ambient light out4 having a shape similar to trapezoid is extracted as the minimum value. Then, based on the result of comparison between the combined distribution data and a threshold (first threshold), the fact that the brightness exceeds the threshold due to reflected light ref5 from the original is detected. The original is thus determined to be in the region A1 and the width of the region A1 is detected as the original width.

In the detection method using the combined distribution data, a performance for the ambient light and a detection performance for a dark original are in conflict with each other, and erroneous detection of the original width may occur depending on the lightness of the original. Specifically, when the aforementioned threshold is increased to be set on the bright side, the effect of the ambient light can be eliminated. Meanwhile when the aforementioned threshold is reduced to be set on the dark side, a dark original is more likely to be detected. Accordingly, when threshold is set in consideration of strong ambient light, the following problem may occur. Although it is possible to detect an original whose lightness is relatively high and whose reflected light ref5 has higher brightness than the ambient light out2 as illustrated in part (a) of FIG. 11, such as a light gray original, in an original whose lightness is relatively low and whose reflected light ref5 has lower brightness than the ambient light out2 as illustrated in part (b) of FIG. 11, such as a dark gray original, the brightness is lower than the threshold also in the region A1 and the original edge cannot be detected.

In view of this, in the embodiment, the threshold is changed depending on the lightness of the original. For example, when the width of the dark gray original is to be detected by means of the black portion detection method, the threshold is reduced to be set on the dark side as illustrated in part (c) of FIG. 11. The detection of the dark color original can be thereby performed without erroneous detection due to ambient light occurring.

Note that the threshold used in (3-2) is a value lower (smaller) than the thresholds used in (1-1) and (3-1). This is because the combined distribution data obtained by extracting the minimum value from the first read data and the second read data for each of predetermined positions in the original width direction is data with the effect of the ambient light reduced, and thus enables accurate detection of the original width even in an original in color and density with low brightness by reducing the effect of the ambient light.

Operation Control in Image Scanning

Description is given of characteristic operation control in image scanning which is performed by the image scanning apparatus 1 in the embodiment having the original width detection functions described above. FIG. 5 is a flowchart depicting operations in image scanning.

First, when size reading processing is started, the image scanning apparatus 1 is set to a standby state by means of loop processing ("N" in S101), until the first angle is detected. Then, when the image scanning apparatus 1 detect that the opened-closed angle of the platen cover 22 has changed from the open state to the first angle ("Y" in S101), the image scanning apparatus 1 emits light to the original at the time point of the first angle and records distribution of the reflected light as the first read data (S102). In this case, the image scanning apparatus 1 may record read data without the effect of the ambient light which is obtained by subtracting the read data in the OFF state from the read data in the ON state by performing the detection of the aforementioned light source ON-OFF difference method.

Then, the image scanning apparatus 1 waits for detection of further angle change of the platen cover 22 from the first angle to the second angle by means of loop processing ("N" in step S103). Upon detection of the second angle ("Y" in step S103), the image scanning apparatus 1 measures elapse of the predetermined time from the detection (S104), emits light to the original after the predetermined time elapses from the passing of the second angle ("Y" in step S104) and records the distribution of the reflected light as the second read data (S105).

Next, the closed state is checked (S106). Specifically, the image scanning apparatus 1 detects presence or absence of the lifted state of the platen cover 22 at the time of obtaining the second read data, based on the result of the second reading processing in step S105. To be more specific, the closed state checker 52j uses the brightness distribution on the front side in the second read data to perform the detection and, when the brightness on the front side is equal to or greater than the predetermined threshold, determines that the angle between the platen 21 and the platen cover 22 is equal to or smaller than the third angle θ3 and the platen cover 22 is not lifted in the small angle region. Meanwhile, when the brightness on the front side 15 smaller than the predetermined threshold, the closed state checker 52j determines that the angle between the platen 21 and the platen cover 22 is equal to or smaller than the second angle θ2 and is greater than the third angle θ3, and the platen cover 22 is therefore in the lifted state in the small angle region. The image scanning apparatus 1 switches the method of original width detection processing depending on the presence or absence of the lifted state of the platen cover 22 (S107). Specifically, when the pressure plate lift is not detected ("N" in S107) the original width detection processing is performed based on the difference between the brightness distribution in the first read data and that in the second read data (S108 to S109). Meanwhile, when the pressure plate lift is detected ("Y" in S107) the original width detection processing is performed with a low brightness portion (dark portion) being set as the non-original portion (S110 to S111). A method of detecting the dark portion can be performed by selecting the detection by means of the black portion detection method illustrated in FIG. 9 or the detection method using the combined distribution data illustrated in FIG. 10.

In detail, in the original width detection processing based on the difference in brightness in steps S108 to S109, there is performed the original width detection in which portion where the brightness changes greatly is set as the non-document portion, based on the result of comparison between the brightness distribution of the first read data and the brightness distribution of the second read data.

Note that, in the embodiment, the threshold for the original width detection is changed (S108 or S110) depending on whether the lifted state of the pressure plate is detected or not in step S107. Specifically, the threshold in the case where the lifted state of the platen cover 22 is detected ("Y" in S107) is set to be smaller than the threshold in the case where no lifted state of the platen cover 22 is detected ("N" in S107).

When no pressure plate lifted state is detected in step S107 a high ambient light change detection threshold is set to increase an amount of allowance for the ambient light, and the image scanning apparatus 1 is made less sensitive to ambient light (S108). In the original width detection processing based on the difference in brightness in step S109, the original width detection in which the portion where the change in brightness is great is set as the nondocument portion is performed by using the thus-changed threshold.

Meanwhile, when the pressure plate lift is detected in step S107 ("Y" in step S107), a low ambient light change detection threshold is set to reduce the amount of allowance for the ambient light, and the image scanning apparatus 1 is made more sensitive to the ambient light (S110).

Then, in the original width detection processing based on the combined distribution data in step S111, the combined distribution data is generated by comparing the first read data and the second read data and extracting the minimum value for each distribution position. Next, the original size detector 52c performs the original width detection based on the result of comparison between the combined distribution data and the predetermined threshold.

Note that, when the opened-closed angle of the platen cover 22 is greater than the second angle in the standby state ("N" in S103) of step S103, the exposure lamp 94 is turned on and off to record the distribution of the reflected light in the lamp on state and the lamp off state and perform ambient light subtraction processing. When the ambient light subtraction processing is executed, the original size detector 52c performs the original width detection in which a portion where brightness changes greatly is set as the non-document portion, based on the difference between the result recorded at the second angle and the result recorded by the ambient light recorder (brightness distribution at the first angle from which the ambient light is subtracted), instead of the brightness distribution at the first angle.

In the embodiment described above, the detection of the closed state of the pressure plate by the closed state checker 52j and the original width detection by the original width detector are performed based on the second read data. However, data used in these detections can be different from the data described above. For example, it is possible that the second read data to be used by the closed state checker 52j for the detection of the closed state is collected after a predetermined time elapses from the platen cover 22 passing the second angle, and then the distribution data of the reflected light to be used for the original width detection is collected at a later timing by turning on the exposure lamp 94. In other words, the predetermined time may include multiple elapsed times after the passing of the second angle.

In the embodiment, description given that the two types of angular sensors 233, 234 are used. However, one of the sensors may be omitted to reduce the number of parts. Specifically, it is possible to omit the sensor 233 and use only the angular sensor 234.

In such a configuration, the brightness distribution recorder 52i is controlled to obtain the first read data when the angular sensor 234 detects that the platen cover 22 is closed to a predetermined angle, and obtain the second read data after a predetermined time elapses from the obtaining of the first read data. Then the closed state checker 52j determines whether the platen cover 22 is closed at an angle smaller than an angle α smaller than the angle detected by the sensor 234, that is determines the lifted state of the platen cover 22, by using the brightness distribution of a portion corresponding to the front side of the platen 21 in the second read data. When the closed state checker 52j determines that the angle between the platen cover 22 and the platen 21 is smaller than the angle α, that is determines that the platen cover 22 is not lifted, the original size detector 52c detects the original width based on the difference between the first read data and the second read data (by using the pressure plate opened-closed state difference method). Meanwhile, when the angle is greater than the angle α, that is the lifted stated is confirmed, the combined data generator 52d generates the combined distribution data obtained by extracting the minimum value from the first read data and the second read data for each distribution position in the main scanning direction, and the original size detector 52c detects the original width based on the combined distribution data.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image scanning apparatus comprising:
   a platen on which an original is placed;
   a pressure plate openable and closable with respect to the platen;
   a first angle detector configured to detect that the pressure plate is closed from an open state to a first angle with respect to the platen;
   a second angle detector configured to detect that the pressure plate is further closed from the first angle to a second angle with respect to the platen;
   a processor; and
   a memory including instructions that, when executed by the processor, causes the processor to perform operations including:
      upon detection of the first angle by the first angle detector, causing light to be emitted to the original and recording a distribution of reflected light of the emitted light as first read data;
      upon elapse of a predetermined time from detection of the second angle by the second angle detector, causing light to be emitted to the original and recording a distribution of reflected light of the emitted light as second read data;
      detecting a closed state of the pressure plate based on the second read data; and
      upon determination of an angle of the pressure plate with respect to the platen being equal to or smaller than a third angle smaller than the second angle in the detection of the closed state, detecting a width of the original in an opening-closing direction of the pressure plate based on a difference between the first read data and the second read data.

2. The image scanning apparatus according to claim 1, wherein the operations include:
   upon the angle of the pressure plate with respect to the platen being equal to or smaller than the first angle and being greater than the second angle, turning on and off the emission of the light, and recording a distribution of reflected light in a state where the emission of the light is on and a distribution of reflected light in a state where the emission of the light is off, as third read data; and
   detecting the width of the original by using the third read data instead of the first read data.

3. The image scanning apparatus according to claim 1, wherein the operations include:
   upon determination of the angle of the pressure plate with respect to the platen being equal to or smaller than the second angle and being greater than the third angle in the detection of the closed state, generating combined distribution data obtained by extracting a minimum value from the first read data and the second read data for each of distribution positions in a direction of the width of the original and detecting the width of the original based on a result of comparison between the generated combined distribution data and a first threshold; and upon determination of the angle of the pressure plate with respect to the platen being equal to or smaller than the third angle in the detection of the closed state, detecting the width of the original based on a second threshold and the difference between the first read data and the second read data.

4. The image scanning apparatus according to claim 1, wherein the operations include, upon determination of the angle of the pressure plate with respect to the platen being equal to or smaller than the second angle and being greater than the third angle in the detection of the closed state, detecting the width of the original based on the first read data and a third threshold.

5. The image scanning apparatus according to claim 1, wherein the operations include, upon determination of the angle of the pressure plate with respect to the platen being equal to or smaller than the second angle and being greater than the third angle in the detection of the closed state:

generating combined distribution data obtained by extracting a minimum value from the first read data and the second read data for each of distribution positions in a direction of the width of the original and detecting the width of the original based on a result of comparison between the generated combined distribution data and a first threshold; or detecting the width of the original based on the first read data and a third threshold greater than the first threshold.

6. An image scanning apparatus comprising:

a platen on which an original is placed;

a pressure plate openable and closable with respect to the platen;

an angle detector configured to detect that the pressure plate is closed from an open state to a predetermined angle with respect to the platen;

a processor; and a memory including instructions that, when executed by the processor, causes the processor to perform operations including:

upon detection of the predetermined angle by the angle detector, causing light to be emitted to the original and recording a distribution of reflected light of the emitted light as first read data;

upon elapse of a predetermined time from detection of the predetermined angle by the angle detector, causing light to be emitted to the original and recording a distribution of reflected light of the emitted light as second read data;

detecting a closed state of the pressure plate based on the second read data;

determining whether an angle of the pressure plate with respect to the platen is equal to or smaller than an angle smaller than the predetermined angle based on the second read data in the detection of the closed state; and upon determination of the angle of the pressure plate with respect to the platen being equal to or smaller than the angle smaller than the predetermined angle in the detection of the closed state, detecting a width of the original in an opening-closing direction of the pressure plate based on a difference between the first read data and the second read data.

7. The image scanning apparatus according to claim 6, wherein the operations include, upon determination of the angle of the pressure plate with respect to the platen being equal to or smaller than the predetermined angle and being greater than the angle smaller than the predetermined angle in the detection of the closed state, generating combined distribution data by extracting a minimum value from the first read data and the second read data for each of distribution positions in a direction of the width of the original and detecting the width of the original based on the generated combined distribution data.

* * * * *